(12) United States Patent
Anderberg et al.

(10) Patent No.: US 12,309,500 B2
(45) Date of Patent: May 20, 2025

(54) TRANS-SPECTRAL FEATURE DETECTION FOR VOLUMETRIC IMAGE ALIGNMENT AND COLORIZATION

(71) Applicants: Sony Group Corporation, Tokyo (JP); Sony Pictures Entertainment Inc., Culver City, CA (US)

(72) Inventors: Tobias Anderberg, Los Angeles, CA (US); Scott Metzger, Los Angeles, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/883,523

(22) Filed: May 26, 2020

(65) Prior Publication Data
US 2021/0185214 A1    Jun. 17, 2021

Related U.S. Application Data

(60) Provisional application No. 62/947,747, filed on Dec. 13, 2019.

(51) Int. Cl.
*G06T 7/33*       (2017.01)
*G01S 17/89*      (2020.01)
(Continued)

(52) U.S. Cl.
CPC ........... *H04N 23/741* (2023.01); *G01S 17/89* (2013.01); *G06T 7/33* (2017.01); *G06T 7/90* (2017.01);
(Continued)

(58) Field of Classification Search
None
See application file for complete search history.

(56) References Cited

U.S. PATENT DOCUMENTS

| 7,003,136 B1 * | 2/2006 | Harville ................. G06T 7/285 |
| | | 382/209 |
| 9,256,980 B2 | 2/2016 | Kirk |
| | (Continued) | |

FOREIGN PATENT DOCUMENTS

| CN | 107705268 A | 2/2018 |
| CN | 109804622 A | 5/2019 |
| | (Continued) | |

OTHER PUBLICATIONS

International Preliminary Report on Patentability in application No. PCT/US2020/064268, Jun. 23, 2022.
(Continued)

*Primary Examiner* — Twyler L Haskins
*Assistant Examiner* — Wesley J Chiu
(74) *Attorney, Agent, or Firm* — Procopio, Cory, Hargreaves & Savitch LLP

(57) ABSTRACT

Aligning and coloring a volumetric image, including: capturing intensity data using at least one scanner; generating an intensity image using the intensity data, wherein the intensity image includes at least one feature in a scene, the at least one feature including a sample feature; capturing image data using at least one camera, wherein the image data includes color information; generating a camera image using the image data, wherein the camera image includes the sample feature; matching the sample feature in the intensity image with the sample feature in the camera image to align the intensity image and the camera image; and generating a color image by applying the color information to the aligned intensity image.

10 Claims, 5 Drawing Sheets

(51) Int. Cl.
*G06T 7/90* (2017.01)
*H04N 5/208* (2006.01)
*H04N 23/73* (2023.01)
*H04N 23/741* (2023.01)

(52) U.S. Cl.
CPC ............. *H04N 5/208* (2013.01); *H04N 23/73* (2023.01); *G06T 2207/10028* (2013.01)

(56) References Cited

U.S. PATENT DOCUMENTS

| | | | |
|---|---|---|---|
| 9,877,009 B2 | 1/2018 | Tran et al. | |
| 2010/0271498 A1* | 10/2010 | Hwang | G06T 7/32 348/222.1 |
| 2012/0098986 A1* | 4/2012 | Robertson | H04N 19/521 348/222.1 |
| 2012/0148162 A1 | 6/2012 | Zhang et al. | |
| 2014/0002694 A1 | 1/2014 | Levy et al. | |
| 2016/0104289 A1* | 4/2016 | Chang | G05D 1/0248 382/154 |
| 2018/0176543 A1* | 6/2018 | Wan | H04N 13/271 |
| 2018/0262737 A1* | 9/2018 | Monnier | H04N 13/15 |
| 2018/0329066 A1 | 11/2018 | Pacala | |
| 2018/0345965 A1 | 12/2018 | Payne | |
| 2020/0088855 A1* | 3/2020 | Zhu | G01S 17/26 |
| 2020/0160487 A1* | 5/2020 | Kanzawa | G06V 10/267 |
| 2020/0160542 A1* | 5/2020 | Kanzawa | G06T 7/337 |
| 2020/0174130 A1* | 6/2020 | Banerjee | G01S 17/89 |

FOREIGN PATENT DOCUMENTS

| | | |
|---|---|---|
| JP | 2010514041 A | 4/2010 |
| JP | 2018503325 A | 2/2018 |
| JP | 2018203250 A | 12/2018 |
| JP | 2019095876 A | 6/2019 |
| KR | 20140100054 A | 8/2014 |
| WO | WO-2008075061 A2 | 6/2008 |
| WO | 2015107260 A1 | 7/2015 |
| WO | WO-2016073648 A2 | 5/2016 |
| WO | WO-2019025035 A1 | 2/2019 |

OTHER PUBLICATIONS

Mahmoudabadi Hamid et al: "Efficient terrestrial laser scan segmentation exploiting data structure", ISPRS Journal of Photogrammetry and Remote Sensing, Amsterdam [U.A.] : Elsevier, Amsterdam, NL, vol. 119, Jun. 10, 2016 (Jun. 10, 2016), pp. 135-150, XP029727861,ISSN: 0924-2716, DOI:10.1016/J.ISPRSJPRS.2016. 05.015.

Michael Weinmann et al: "Advances in geometry and reflectance acquisition (course notes)", Nov. 2, 2015; 1077952576-1077952576, Nov. 2, 2015 (Nov. 2, 2015), pp. 1-71, XP058075388, DOI: 10.1145/2818143.2818165 ISBN: 978-1-4503-3924-7.

Juan Li, et al., 2D LiDAR and Camera Fusion in 3D Modeling of Indoor Environment, 2015 National Aerospace and Electronics Conference (NAECON), Jun. 15-19, 2015, IEEE, ISSN: 2379-2027, DOI: 10.1109/NAECON.2015.7443100.

* cited by examiner

TRANS-SPECTRAL FEATURE DETECTION FOR VOLUMETRIC IMAGE ALIGNMENT AND COLORIZATION

CROSS-REFERENCE TO RELATED APPLICATIONS

This application claims the benefit of priority under 35 U.S.C. § 119(e) of co-pending U.S. Provisional Patent Application No. 62/947,747, filed Dec. 13, 2019, entitled "Trans-Spectral Feature Detection for Volumetric Image Alignment and Colorization." The disclosure of the above-referenced application is incorporated herein by reference.

BACKGROUND

Field

The present disclosure relates to image alignment and colorization, and more specifically, to trans-spectral feature detection for volumetric image alignment and colorization.

Background

Video systems used in video production, studio environment, or virtual production may reproduce a scene using a combination of laser scanner and color photography. This reproduction operation may include manually using an image alignment program to match points between the color photograph and the intensity image generated from the laser scan. However, the manual operation of defining and matching corresponding points in the two images is cumbersome and takes a long time to process.

SUMMARY

The present disclosure provides for volumetric image alignment and colorization.

In one implementation, a method for image alignment and colorization is disclosed. The method includes: capturing intensity data using at least one scanner; generating an intensity image using the intensity data, wherein the intensity image includes at least one feature in a scene, the at least one feature including a sample feature; capturing image data using at least one camera, wherein the image data includes color information; generating a camera image using the image data, wherein the camera image includes the sample feature; matching the sample feature in the intensity image with the sample feature in the camera image to align the intensity image and the camera image; and generating a color image by applying the color information to the aligned intensity image.

In one implementation, wherein the at least one scanner includes at least one LIDAR scanner. In one implementation, the intensity data captured by the at least one LIDAR scanner is a 3-D intensity image. In one implementation, the method further includes applying the color information on the 3-D intensity image. In one implementation, the method further includes generating a 2-D intensity image from the 3-D intensity image. In one implementation, the at least one camera includes at least one HDR camera. In one implementation, the camera data captured by the at least one HDR camera is a 2-D color photograph. In one implementation, generating the camera image using the image data includes performing exposure stacking and color corrections on the image data to generate the camera image. In one implementation, the method further includes: generating one or more control points in the intensity image; and receiving adjustments to the alignment of the intensity image and the camera image. In one implementation, the method further includes: performing correction of any lens distortions in the camera image; and receiving adjustments to the alignment of the intensity image and the camera image.

In another implementation, a system to align and color a volumetric image is disclosed. The system includes: at least one scanner to capture intensity data; at least one camera to capture image data including color information; and a processor to: generate an intensity image using the captured intensity data, wherein the intensity image includes at least one feature in a scene, the at least one feature including a sample feature; generate a camera image using the image data, wherein the camera image includes the sample feature; match the sample feature in the intensity image with the sample feature in the camera image to align the intensity image and the camera image; and generate a color image by applying the color information to the aligned intensity image.

In one implementation, the at least one scanner includes at least one LIDAR scanner. In one implementation, the intensity data captured by the at least one LIDAR scanner is a 3-D intensity image. In one implementation, the at least one camera includes at least one HDR camera. In one implementation, the system further includes a cloud cluster to receive the intensity image and the camera image from the processor, perform the matching and the alignment, and send a result back to the processor.

In another implementation, a non-transitory computer-readable storage medium storing a computer program to align and color a volumetric image is disclosed. The computer program includes executable instructions that cause a computer to: capture video data using a plurality of cameras; capture intensity data; generate an intensity image using the intensity data, wherein the intensity image includes at least one feature in a scene, the at least one feature including a sample feature; capture image data, wherein the image data includes color information; generate a camera image using the image data, wherein the color image includes the sample feature; match the sample feature in the intensity image with the sample feature in the camera image to align the intensity image and the camera image; and generate a color image by applying the color information to the aligned intensity image.

In one implementation, the captured intensity data is a 3-D intensity image. In one implementation, the computer-readable storage medium further includes executable instructions that cause the computer to generate a 2-D intensity image from the 3-D intensity image. In one implementation, the executable instructions that cause the computer to generate the camera image using the image data includes executable instructions that cause the computer to perform exposure stacking and color corrections on the image data to generate the camera image. In one implementation, the computer-readable storage medium further includes executable instructions that cause the computer to: generate one or more control points in the intensity image; and receive adjustments to the alignment of the intensity image and the camera image.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, video systems used in video production, studio environment, or virtual production may reproduce a scene using a combination of laser scanner and color photography, which may involve manually using an image alignment program to match points between the color photograph and the intensity image generated from the laser scan. However, the manual operation of defining and matching corresponding points in the two images is cumbersome and takes a long time to process.

Certain implementations of the present disclosure provide systems and methods to implement a technique for processing video data. In one implementation, a video system captures video data for a subject and environment, and creates volumetric dataset with color for the points. In one implementation, the system automates assigning color to points.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation of a new system, a Light Detection and Ranging (LIDAR) scanner (e.g., a laser scanner) is used to produce a volumetric point cloud (3-D) represented by intensity data without color. However, in order to replicate the real-world environment that was scanned using the LIDAR scanner, a high-dynamic-range (HDR) photograph (color image) of the environment is taken and mapped to a 2-D image representation for the LIDAR scanned intensity data.

In one implementation, the new system captures intensity information with one or more LIDAR scanners and captures image and color information with one or more cameras. The new system uses image feature detection in both the color photography and the intensity image, and maps, aligns, and/or matches (collectively referred to as "alignment") the two trans-spectral images (e.g., intensity and color images) together. The system can also allow for fine tuning of detection points to improve the alignment.

In one implementation, an image feature detection method includes automatically detecting, matching, and aligning features within a color photograph to features within an intensity image from a real-world LIDAR scan. The image feature detection method also includes steps for correcting lens distortion during the alignment process. The method further includes manual fine tuning, adjustments to the alignment, and utilizing asynchronous compute shaders of the graphics processing unit (GPU) for computation and coloring.

Figure 1A:
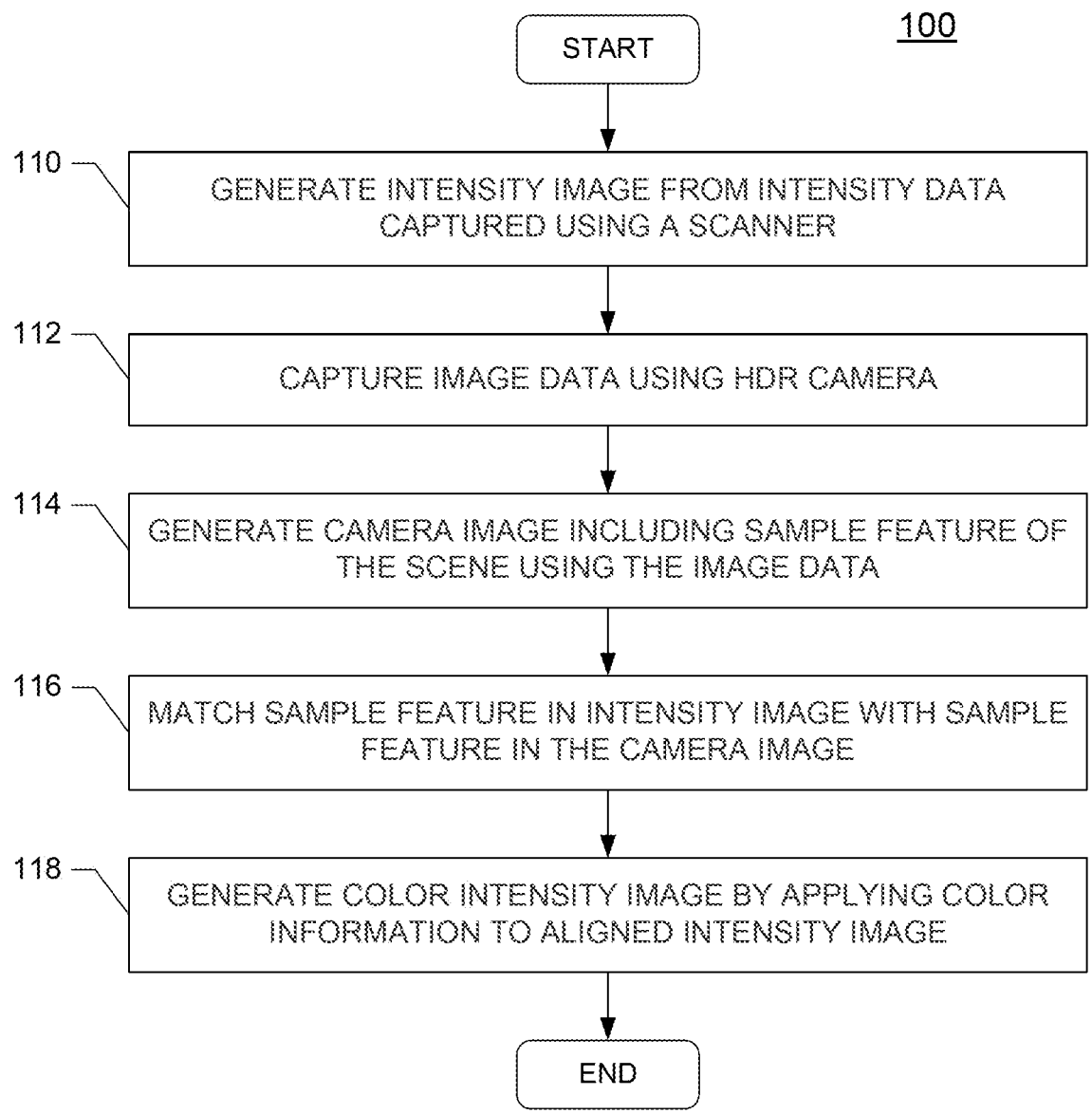
FIG. 1A is a flow diagram of a method for volumetric image alignment and colorization in accordance with one implementation of the present disclosure.

FIG. 1A is a flow diagram of a method 100 for volumetric image alignment and colorization in accordance with one implementation of the present disclosure. In one implementation, the method includes reproducing a scene using a LIDAR scanner and HDR photography. Thus, this reproduction of the scene includes scanning the environment with the LIDAR scanner from multiple locations (to produce 3-D intensity data of the scene) and photographing the scene from multiple locations with multiple exposures using HDR cameras (to produce 2-D color image data of the scene).

In one implementation, a 2-D intensity image is generated from the 3-D intensity data of the scene. Exposure stacking and color corrections are performed on the 2-D color image data to generate an HDR image corresponding to the intensity image of a particular view of the scene scanned by the LIDAR scanner. Features in the HDR image are then matched with features in the 2-D intensity image. Feature detection techniques include, among others, histogram feature detection, edge based feature detection, spectral feature detection, and co-occurrence feature detection.

In the illustrated implementation of FIG. 1A, an intensity image is generated, at step 110, from the intensity data captured using a scanner. In one implementation, the intensity image includes at least one feature in a scene and the at least one feature includes a sample feature. An HDR camera is used to capture image data, at step 112, which includes color information. The image data is used to generate a camera image, at step 114, which includes the sample feature of the scene. At step 116, the sample feature in the intensity image is matched with the sample feature in the camera image to align the intensity image and camera image. A color intensity image is generated, at step 118, by applying the color information to the aligned intensity image.

In a further implementation, during the alignment process and after it is completed, any lens distortion is corrected and control points that can be used to fine tune the alignment are presented using a GPU. In another implementation, the color is applied directly to the LIDAR 3-D intensity data.

In an alternative implementation to the method for volumetric image alignment and colorization, the matching and aligning operations are done "offline" on a high-powered cloud cluster to which the user can upload the 2-D LIDAR intensity image along with the HDR photography. The cloud cluster then executes the above process, and presents the user with the final result.

Figure 1B:
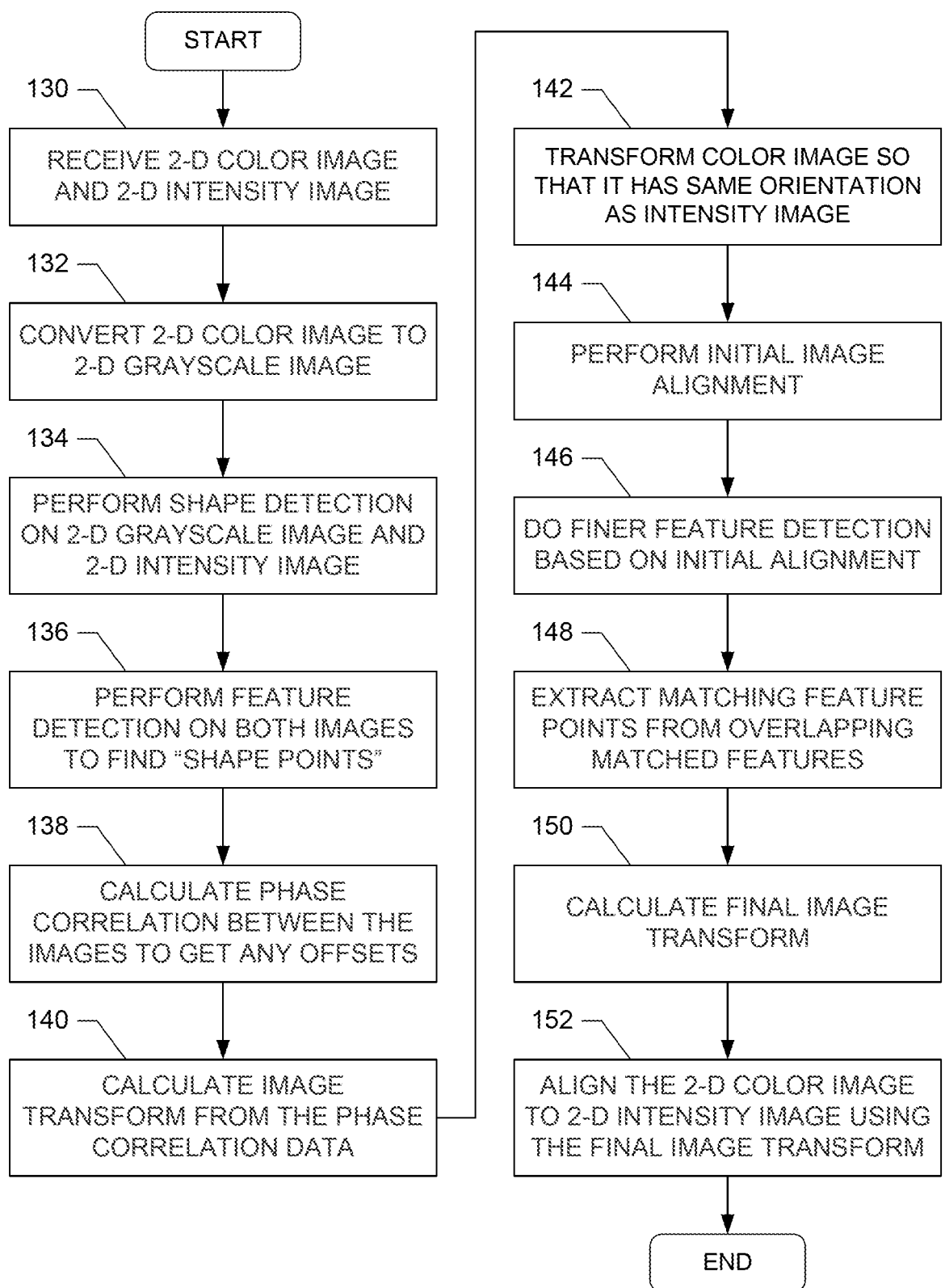
FIG. 1B is a flow diagram of a method for volumetric image alignment and colorization in accordance with another implementation of the present disclosure.
Figure 1C:
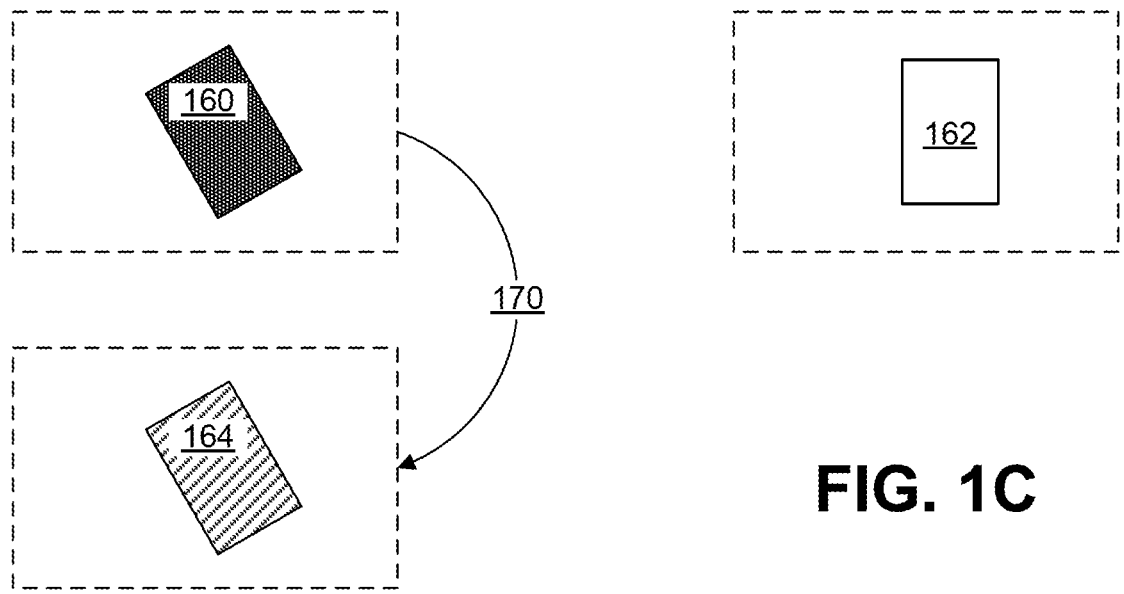
FIG. 1C shows process illustrations of the steps described in FIG. 1B.
Figure 1C:
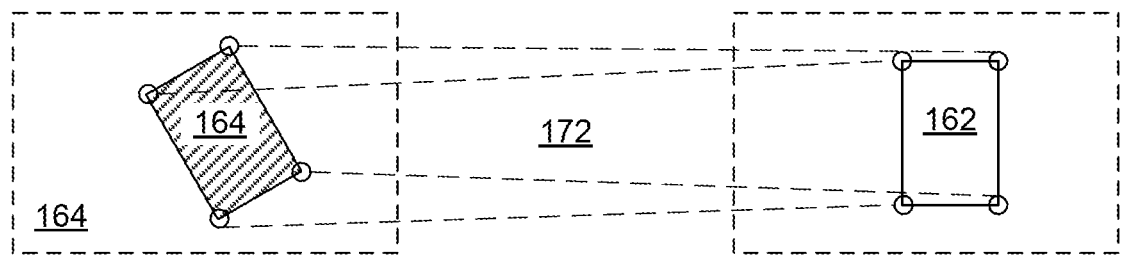
Figure 1C:
Figure 1C:
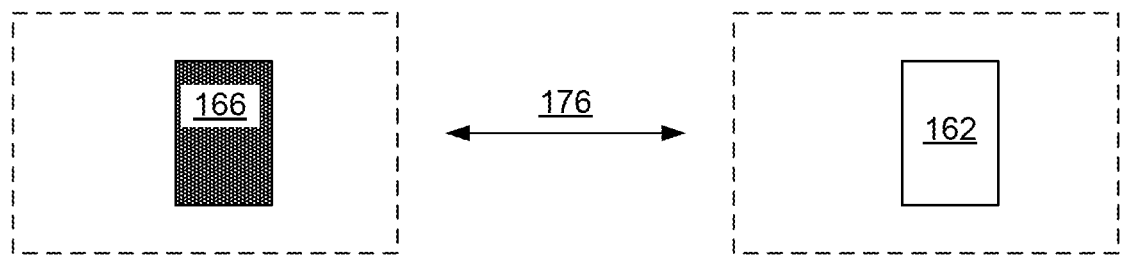

FIG. 1B is a flow diagram of a method 120 for volumetric image alignment and colorization in accordance with another implementation of the present disclosure. FIG. 1C shows process illustrations of the steps described in FIG. 1B.

In the illustrated implementation of FIG. 1B and FIG. 1C, two images, 2-D color image 160 and 2-D intensity image 162, are received, at step 130. The 2-D color image 160 is then converted, at step 132, to 2-D grayscale image 164 (see process 170 in FIG. 1C). At step 134, a first pass shape detection is performed on both the 2-D grayscale image 164 and the 2-D intensity image 162 (see process 172 in FIG. 1C). With the detected shapes, a first pass feature detection is performed, at step 136, to find matching "shape points" in both images. In the example of FIG. 1C, the color image is not a direct "match" with the intensity image (i.e., the color image (in P coordinate) is slightly rotated with respect to the intensity image (in Q coordinate)). Thus, a phase correlation between the images is then calculated, at step 138, to get any offsets (see process 174 in FIG. 1C). An image transform is calculated, at step 140, using the phase correlation data, and the 2-D color image is transformed, at step 142, using the image transform so that the transformed 2-D color image 166 has the same orientation as the 2-D intensity image.

In one implementation, the method 120 further includes performing an initial image alignment, at step 144, and performing a finer feature detection, at step 146. For example, the initial image alignment may include pre-processing for edges and the finer feature detection may include feeding the result of the pre-processing into the Hough Algorithms or other line/feature detection. Matching feature points are extracted, at step 148, from the overlapping matched features based on some heuristic characteristics such as "sharp corner match" or other feature matching. At step 150, a final image transform is calculated using the shape points found in step 136, the feature points extracted in step 148, and the phase correlation calculated in step 138. Finally, the 2-D color image (source image) is aligned, at step 152, to the 2-D intensity image (target image) using the final image transform (see process 176 in FIG. 1C).

Figure 2:
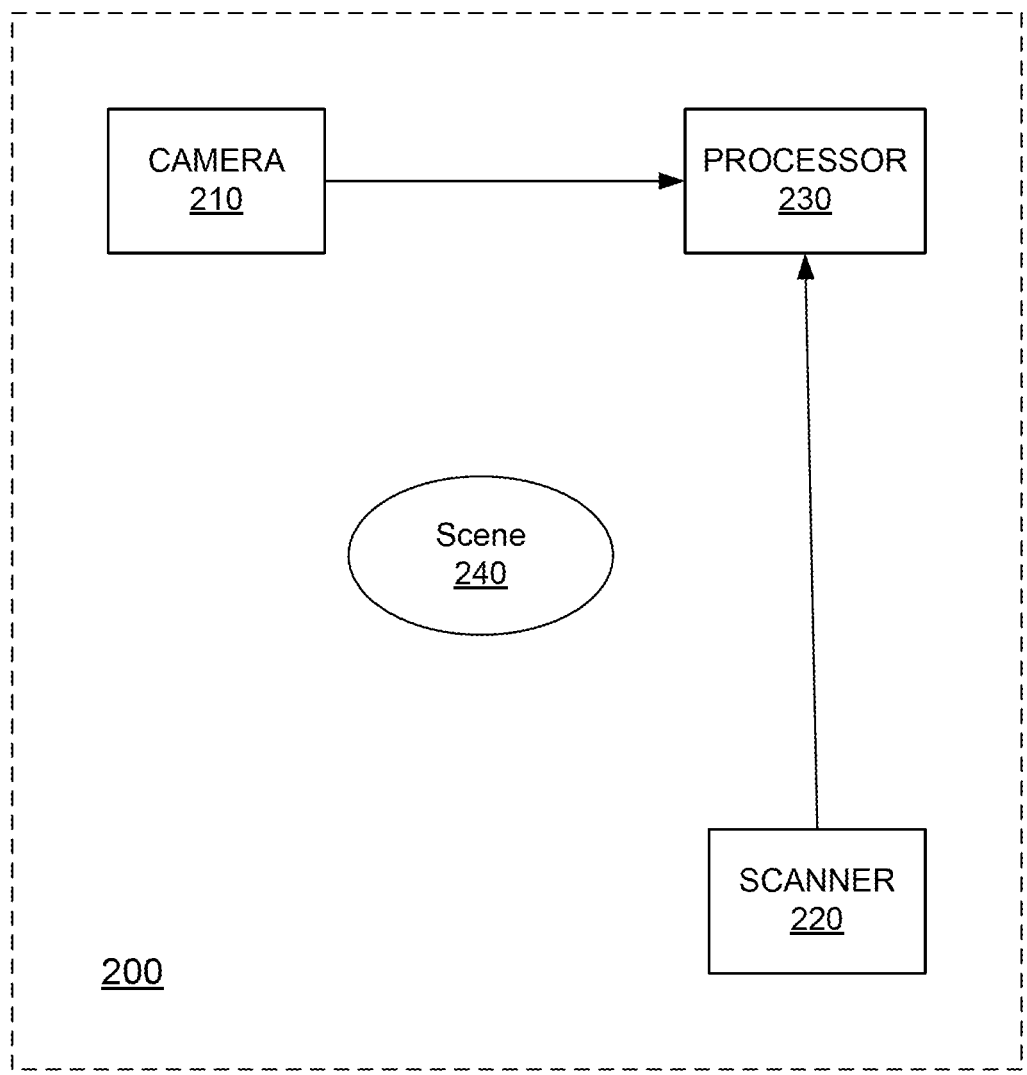
FIG. 2 is a block diagram of a system for volumetric image alignment and colorization in accordance with one implementation of the present disclosure.

FIG. 2 is a block diagram of a system 200 for volumetric image alignment and colorization in accordance with one implementation of the present disclosure. In the illustrated implementation of FIG. 2, the system 200 is used in a video production, studio environment, or virtual production to reproduce a scene, and includes a camera 210 for image capture, a scanner and/or sensor 220, and a processor 230 to process the camera and sensor data. In one implementation, the camera 210 includes an HDR camera, while the scanner/sensor 220 includes a LIDAR scanner. Thus, in one particular implementation, this reproduction of the scene includes scanning the scene with the LIDAR scanner 220 to produce 3-D intensity data of the scene and photographing the scene using the HDR cameras to produce 2-D color image data of the scene. Although the illustrated implementation shows only one camera and one scanner, one or more additional cameras and/or one or more additional scanners may be used.

In one implementation, the processor 230 receives the intensity data captured by the LIDAR scanner 220 and generates an intensity image. In one implementation, the intensity image includes the features (including a sample feature) of the scene. The processor 230 also receives the image data (which includes color information) captured by the HDR camera 210 and generates a camera image (including the sample feature). The processor 230 matches the sample feature in the intensity image with the sample feature in the camera image to align the intensity image and camera image. The processor 230 generates a color intensity image by applying the color information to the aligned intensity image.

In a further implementation, the processor 230 also performs correction of any lens distortion and controls points that can be used to fine tune the alignment. In one implementation, the processor 230 is configured as a GPU. In an alternative implementation, the processor 230 outsources the matching and aligning operations by uploading the 2-D LIDAR intensity image along with the HDR photography to a high-powered cloud cluster. The cloud cluster then executes the above process, and sends the final result back to the processor 230.

Figure 3A:
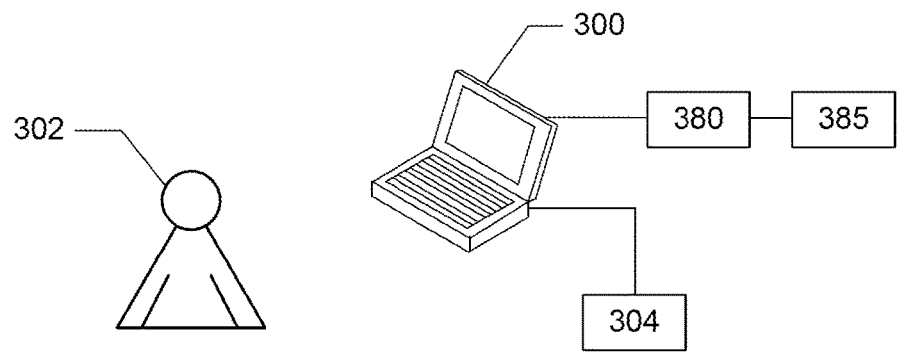
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an alignment and colorization application 390 for volumetric image alignment and colorization as illustrated and described with respect to the methods 100, 120 in FIGS. 1A and 1B and the system 200 in FIG. 2.

Figure 3B:
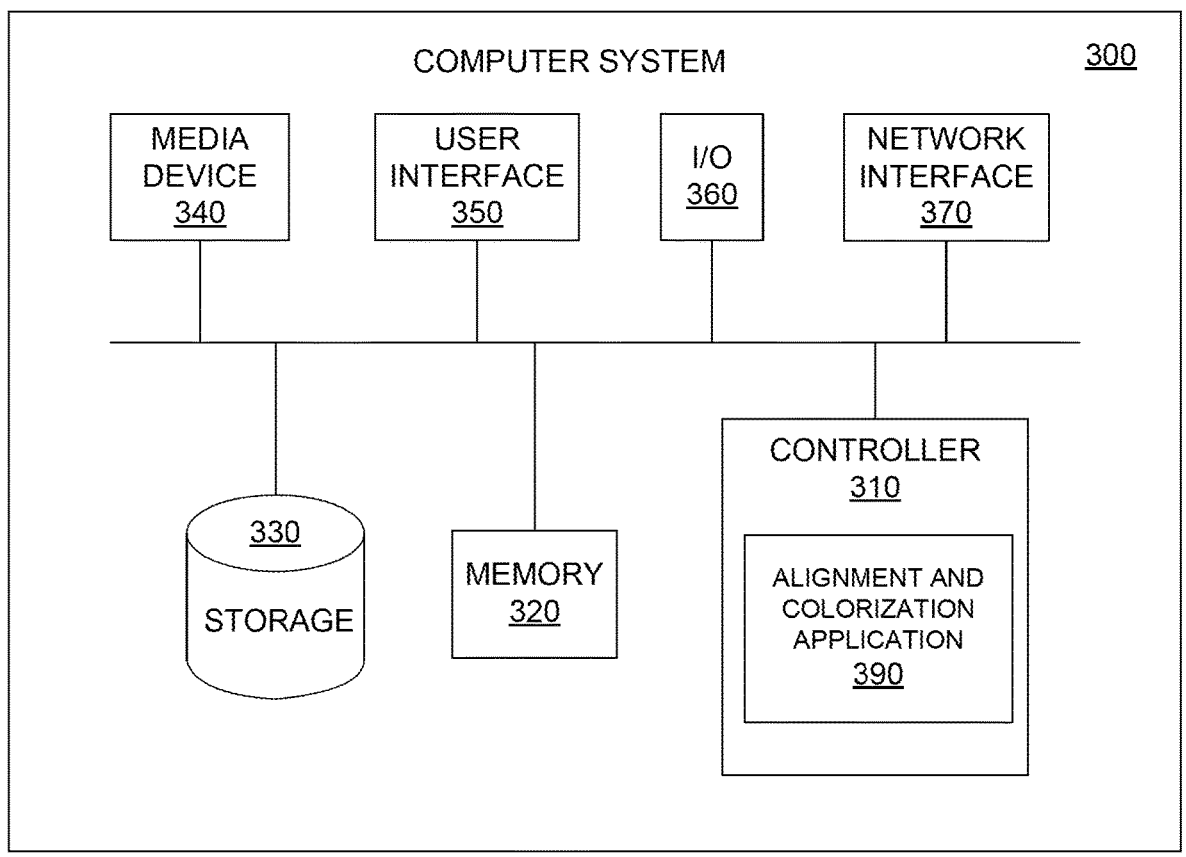
FIG. 3B is a functional block diagram illustrating the computer system hosting the alignment and colorization application in accordance with an implementation of the present disclosure.

The computer system 300 stores and executes the alignment and colorization application 390 of FIG. 3B. In addition, the computer system 300 may be in communication with a software program 304. Software program 304 may include the software code for the alignment and colorization application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the alignment and colorization application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the alignment and colorization application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing to establish depth and render data to present visualizations. In its execution, the controller 310 provides the alignment and colorization application 390 with a software system, such as to enable the creation of groups of devices and transmission of device setting data in parallel using task queues. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the alignment and colorization application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, in addition to video production for movies or television, implementations of the system and methods can be applied and adapted for other applications, such as virtual production (e.g., virtual reality environments), or other LIDAR or 3D point space colorization applications. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A non-transitory computer-readable storage medium storing a computer program to align and color a volumetric image, the computer program comprising executable instructions that cause a computer to:
   receive a 2-D color image and a 2-D intensity image;
   convert the 2-D color image to a 2-D grayscale image;
   perform a shape detection on the 2-D grayscale image and the 2-D intensity image to produce detected shapes;
   perform a feature detection on the detected shapes to find matching shape points in the 2-D grayscale image and the 2-D intensity image;
   calculate a phase correlation between the 2-D grayscale image and the 2-D intensity image;
   transform the 2-D color image using the phase correlation to produce a correlated 2-D color image which has same orientation as the 2-D intensity image;
   perform an initial image alignment including pre-processing for edges to produce a result;
   perform finer feature detection based on the initial image alignment including feeding the result into a line detection processing to produce matched features;
   extract matching feature points from the matched features;
   calculate a final image transform using the matching shape points, the phase correlation, and the extracted matching feature points; and
   align the 2-D color image to the 2-D intensity image using the final image transform.

2. The non-transitory computer-readable storage medium of claim 1, further comprising executable instructions that cause the computer to
   perform exposure stacking and color corrections on the 2-D color image.

3. The non-transitory computer-readable storage medium of claim 2, further comprising executable instructions that cause the computer to:
   generate one or more control points in the 2-D intensity image during the alignment of the volumetric image.

4. The non-transitory computer-readable storage medium of claim 1, further comprising executable instructions that cause the computer to
   capture and reproduce a 3-D intensity image of a scene from multiple locations using at least one scanner.

5. The non-transitory computer-readable storage medium of claim 4, wherein the at least one scanner includes at least one Light Detection and Ranging (LIDAR) scanner.

6. The non-transitory computer-readable storage medium of claim 4, further comprising executable instructions that cause the computer to
   apply color information on the 3-D intensity image to produce the 2-D intensity image.

7. The non-transitory computer-readable storage medium of claim 4, further comprising executable instructions that cause the computer to
   capture the scene from multiple locations with multiple exposures using at least one camera to generate the 2-D color image.

8. The non-transitory computer-readable storage medium of claim 7, wherein the at least one camera includes at least one high-dynamic-range (HDR) camera.

9. The non-transitory computer-readable storage medium of claim 1, further comprising executable instructions that cause the computer to
   perform correction of lens distortions in the 2-D color image during the image alignment.

10. The non-transitory computer-readable storage medium of claim 1, further comprising executable instructions that cause the computer to:
   send the 2-D color image and the 2-D intensity image to a cloud cluster, and
   wherein the shape detection, the feature detection, the phase correlation, the 2-D color image transformation, the initial image alignment, the finer feature detection, the matching feature points extraction, and the final image transformation are performed in the cloud cluster to produce an output;
   receive the output from the cloud cluster.

* * * * *